(12) United States Patent
Greenland

(10) Patent No.: US 6,181,077 B1
(45) Date of Patent: Jan. 30, 2001

(54) SAFE AND RELIABLE POWER SUPPLY FOR XENON ARC LAMP

(75) Inventor: Douglas John Greenland, Girton (GB)

(73) Assignee: EG&G ILC Technology, Inc., Sunnyvale, CA (US)

( * ) Notice: Under 35 U.S.C. 154(b), the term of this patent shall be extended for 0 days.

(21) Appl. No.: 09/434,687

(22) Filed: Nov. 4, 1999

(51) Int. Cl.[7] .................................................. H05B 37/02
(52) U.S. Cl. ......................... 315/225; 315/224; 315/244; 315/307
(58) Field of Search ..................................... 315/307, 244, 315/224, 225, 308, 209 R, 127, 149, 150, 155, 156, 159, 219

(56) References Cited

U.S. PATENT DOCUMENTS 5,650,694 * 7/1997 Jayaraman et al. .................. 315/225
5,869,935 * 2/1999 Sodhi ................................... 315/225
5,925,990 * 7/1999 Crouse et al. ........................ 315/307

* cited by examiner

*Primary Examiner*—David Vu
*Assistant Examiner*—Wilson Lee
(74) *Attorney, Agent, or Firm*—Thomas E. Schatzel Law Offices of Thomas E. Schatzel, A Prof. Corp.

(57) ABSTRACT

A power supply for a xenon arc lamp that will automatically shut down if the lamp current is too high, the lamp voltage is too high, or the lamp requires too many trigger pulses to ignite it. Such conditions indicate faults in the lamp itself and should not be operated this way for safety. Lamp-on and end-of-lamp-life indications are provided to the operator for maintenance. The cooling fan power supply must be normal or the lamp will be shut off or not started. In combination, such provide a lamp system that can safely operate at very high powers.

3 Claims, 5 Drawing Sheets

SAFE AND RELIABLE POWER SUPPLY FOR XENON ARC LAMP

BACKGROUND OF THE INVENTION

1. Field of the Invention

The invention relates generally to arc lamps, and specifically to the electronic control and power supply systems used with xenon arc lamps.

2. Description of the Prior Art

Short arc lamps provide intense point sources of light that allow light collection in reflectors for applications in medical endoscopes, instrumentation and video projection. Also, short arc lamps are used in industrial endoscopes, for example in the inspection of jet engine interiors. More recent applications have been in color television receiver projection systems.

A typical short arc lamp comprises an anode and a sharp-tipped cathode positioned along the longitudinal axis of a cylindrical, sealed concave chamber that contains xenon gas pressurized to several atmospheres. U.S. Pat. No. 5,721,465, issued Feb. 24, 1998, to Roy D. Roberts, describes such a typical short-arc lamp. A typical xenon arc lamp, such as the CERMAX marketed by EGG/ILC Technology (Sunnyvale, Calif.) has a two-legged strut system that holds the cathode electrode concentric to the lamp's axis and in opposition to the anode.

As a xenon arc lamp ages, it either will fail to ignite or not ignite properly. Lamp output can also diminish due to blackening inside the glass envelope. It is therefore useful to provide operators with warning and status indicators that can help keep the lamps running at their best.

The power supplies for xenon arc lamps also need to monitor the output voltage and current that they are delivering to the lamp so that automatic shutdowns can be done when the lamp develops a fault. Since cooling is so critical, the health of the forced air cooling fan needs to also be monitored through the availability of electrical power to the fan.

SUMMARY OF THE PRESENT INVENTION

It is therefore an object of the present invention to provide a power supply and control circuit for a xenon arc lamp.

Briefly, an embodiment of the present invention is a power supply for a xenon arc lamp. The power supply will automatically shut down if the lamp current is too high, or the lamp voltage is too high. Lamp-on and end-of-lamp-life indications are provided to the operator for maintenance. The cooling fan power supply must be normal or the lamp will be shut off or not started.

An advantage of the present invention is that a xenon arc lamp power supply is provided that improves lamp operating safety.

These and other objects and advantages of the present invention will no doubt become obvious to those of ordinary skill in the art after having read the following detailed description of the preferred embodiment which is illustrated in the drawing figures.

IN THE DRAWINGS

DETAILED DESCRIPTION OF THE PREFERRED EMBODIMENT

Figure 1:
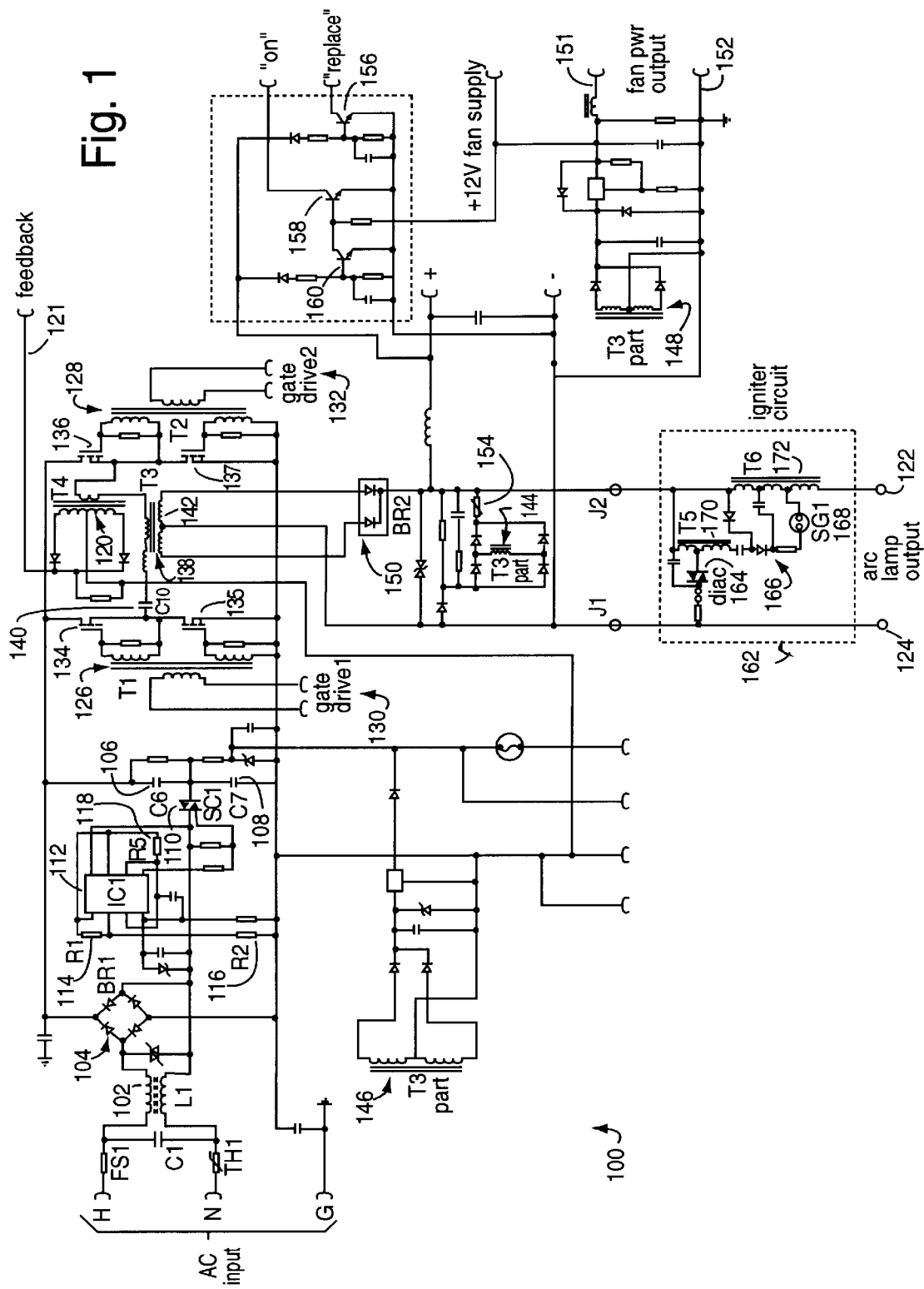
FIG. 1 is a schematic diagram of a power supply embodiment of the present invention for a high-intensity short arc lamp.

FIG. 1 represents a full bridge resonant converter (FBRC) power supply embodiment of the present invention, referred to herein by the general reference numeral 100. Such FBRC power supply is preferably used as a power supply for a high-intensity short arc lamp. The general specifications preferred for such power supply are listed in Table I.

TABLE I

| Topology | Full Bridge Resonant Mode Converter |
|---|---|
| Switching Frequency | 250KHz ± 10% |
| Line Operating Voltage | 90 - 132, 180 - 264 VAC |
| Max Input Current | 6A |
| Output Current Range | 4 - 24A |
| Trigger Voltage | 25 - 35KV |
| Boost Voltage | 270 - 300V DC |
| Fan Output Voltage | +12V DC @ 1A Max |
| Features: | Auto shut down >24A |
|  | Remote Enable |
|  | Lamp ON Indication |
|  | Lamp Replace Indication |
| Regulatory requirements: | UL2601-1, CSA222 No 6061 |
|  | UL3101 No 1010-1 CB Certificate |

Referring now to the schematic of FIG. 1, AC-mains utility power is input to the power supply 100 through a filter choke (L1) 102 and is rectified by a bridge rectifier (BR1) 104. A DC operating voltage of +400 V is obtained from bridge rectifier (BR1) 104 and across filter capacitors (C6, C7) 106 and 108. Bridge rectifier (BR1) 104 can be switched to operate as either a full-wave or half-wave bridge by a silicon controlled rectifier (SCR1) 110. Which mode is used depends on the input line input voltage in conjunction with the auto select line input.

The objective of switching between full-wave or half-wave bridge operation is to produce about the same DC operating voltage of about +400 V across filter capacitors (C6, C7) 106 and 108 for either 120 VAC or 230 VAC inputs. Silicon controlled rectifier (SCR1) 110 is controlled by a universal voltage monitor (UVM) integrated circuit (IC1) 112, e.g., a Motorola type MC34161.IC1 has two level-comparators that are each referenced to an internal "1V27" standard. Two resistors (R1, R2) 114 and 116 are used to set a voltage threshold "+Ve" that causes the half-wave to full-wave changeover to occur at an AC-input of about 132 VAC. A second threshold is used for the full-wave to half-wave changeover, and is determined by a resistor (R5) 118. Therefore, SCR1 forces DB1, C6, and C7 to operate in a full-wave bridge mode at AC-input line voltages of 90–132 VAC and to a half-wave mode at AC-input line voltages of 180–265 VAC.

Figure 2:
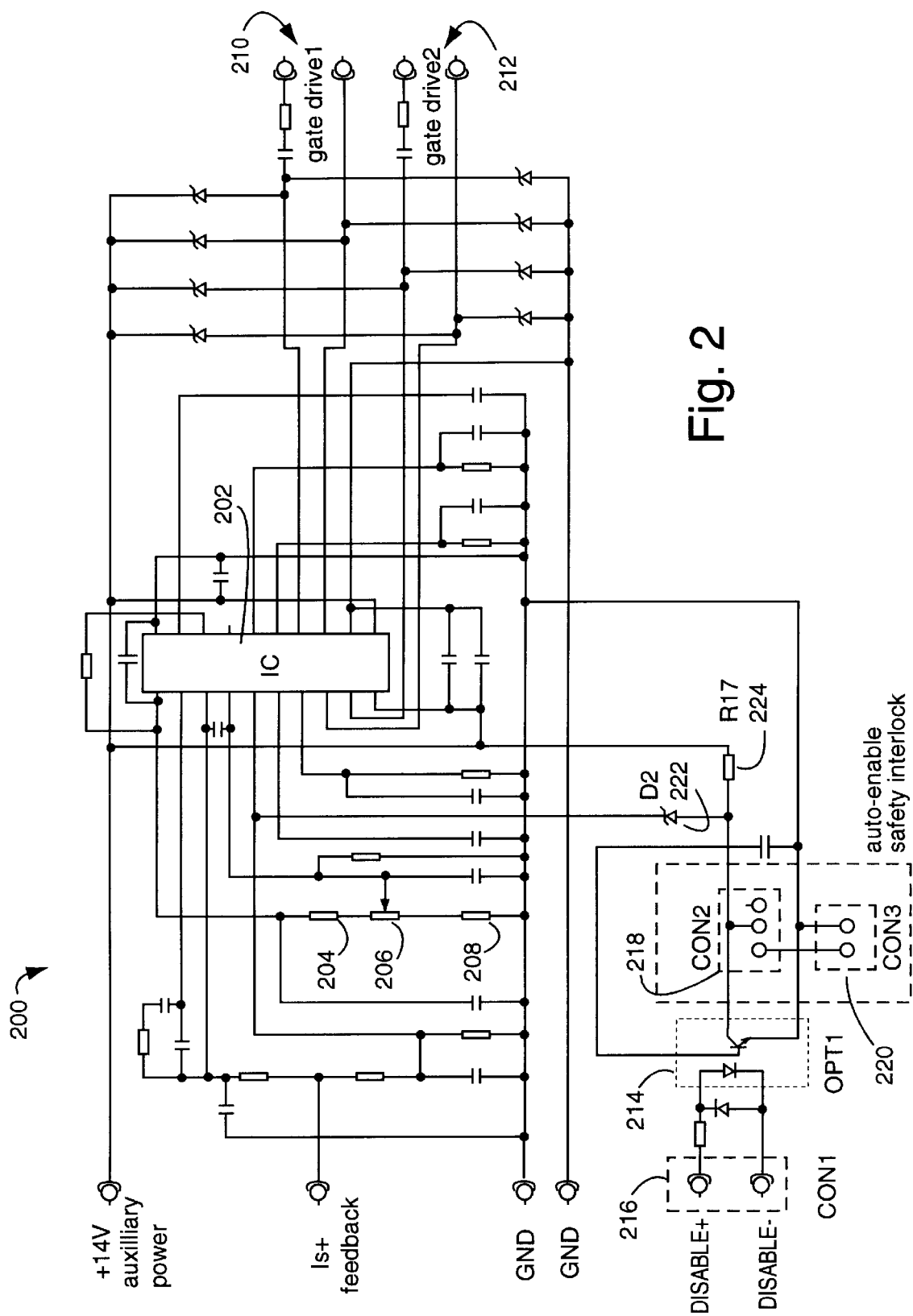
FIG. 2 is a schematic diagram of a switch mode controller embodiment of the present invention that is used in conjunction with the power supply of FIG. 1.

A current-sense transformer (T4) 120 allows the output load to be sampled. A current control loop with a voltage proportional to the lamp current is obtained from the secondary winding of T4. Such voltage is rectified and output on a feedback terminal 121. The arc lamp powered by the power supply 100 is connected across output load terminals 122 and 124. Such arc lamp may be of the CERMAX type marketed by EGG/ILC Technology (Sunnyvale, Ca). A "resonant-bridge" is formed by transformers (T1, T2) 126 and 128. Inputs from the switch mode controller illustrated in FIG. 2 are received at a gate-drive-one input 130 and gate-drive-two input 132.

A resonant mode converter is constructed by controlling the resonant-bridge with two totem-pole pairs of MOSFET transistors (TR1, TR2, TR3, TR4) 134–137, e.g., type IRFP450 MOSFET devices. A resistor is connected between the source and gate of each MOSFET device to reduce parasitic turn-on. Transformers T1 and T2 control the resonant bridge and output anti-phase pulses. A resonant part of the circuit which operates at 250 KHz ten percent comprises a switch-mode transformer (T3) 138, the primary winding of transformer (T4) 120, and a capacitor (C10) 140.

The switch-mode transformer (T3) 138 has four secondary windings: a main output winding 142 that produces 31 VAC, a boost output winding 144 that produces 200 VAC, an auxiliary supply winding 146 that produces 30 VAC, and a fan supply winding 148 that produces 30 VAC (all for a nominal 240 VAC line input). The main winding 142 consists of nine turns, center-tapped, and is connected to a 300A, 400 V bridge rectifier (BR2) 150, e.g., a type MUR3040. BR2 preferably has a peak rectified forward current of 30A @ 145° C., and is mounted on a ceramic heat-sink.

The boost output winding 144 helps produce a 300 VDC boost voltage that is used to initiate the arc lamp. The fan winding 148 delivers a maximum of 30 VAC and is half-wave rectified and filtered for use by a fan connected to a pair of fan output terminals 151 and 152.

The 300 VDC boost voltage is only required during ignition of the arc lamp. To ensure this voltage is afterwards isolated from the output, a positive temperature coefficient (PTC) thermistor (PT1) 154 is used, e.g., 1,000 ohms at 25° C. Once the arc lamp has struck, the boost voltage will become isolated because the resistance of thermistor (PT1) 154 will greatly increase as it passes current.

An external light emitting diode (LED) to indicate the lamp needs replacing is connected to an open-collector NPN-transistor 156. The "replace lamp" warning is given when the operating voltage across the lamp output terminals 122 and 124 exceed some threshold, e.g., 18 VDC. As a CERMAX lamp ages its operating voltage will increase. This is always associated with a worn out lamp. The base of transistor 156 will become forward biased by a simple voltage divider connected across lamp output terminals 122 and 124. If the lamp connected between output terminals 122 and 124 is on at all, a transistor 158 will switch on and drive another external LED indicator, this one for "lamp on". A transistor 160 will prevent transistor 158 from switching on as long as the voltage across output terminals 122 and 124 is too high, indicating a lamp that is not connected or has not been ignited. Such LED indications can be placed remotely at convenient observation points in the user's application. Both of these LED drivers are primary side isolated.

The igniting of CERMAX lamps requires a boost voltage of at least 250 VDC be applied together with series-induced trigger-pulses of 25–30 KV. A trigger circuit 162 supplies just these voltages. It comprises a DIAC 164, a charge pump network 166, a spark gap (SG1) 168, and autoformer (T5) 170. When a 300 VDC boost voltage is applied across the DIAC 164, a pulse is sent through the autoformer (T5) 170 and feeds into the charge-pump network 166. When the pulse voltage reaches 6,000 volts, spark gap (SG1) 168 will break down and cause a 30,000 volt pulse two-hundred nanoseconds wide to be generated in an autoformer (T6) 172. This will appear in series with the boost voltage at the output terminals 122 and 124 and initiate the CERMAX lamp.

FIG. 2 illustrates a switch mode controller 200 that is used in conjunction with the power supply 100 to safely and reliably operate high power arc lamps. The switch mode controller 200 includes a phase-shift resonant-mode controller integrated circuit (IC) 202, e.g., a type UC3875. IC 202 controls resonant bridges by generating a phase-shifting signal with pulse widths that are determined by a voltage divider formed by resistors 204, 206, and 208. Such resistors are connected in series between an internal +5 V reference of IC 202 and ground.

A voltage output "+Ve" from the wiper of resistor 206 is connected to the plus-input of an internal error amplifier within IC 202. A minus-input of this same internal error amplifier receives a sense DC voltage obtained from an output current sense transformer, e.g., transformer (T4) 120 in FIG. 1. This signal is connected through from feedback terminal 121 (FIG. 1). Voltage differences at these two inputs of the error amplifier will determine the phase and pulse widths produced by IC 202 at gate-drive-one output 210 and gate-drive-two output 212. Such outputs ultimately drive the "resonant-bridge" formed by transformers (T1, T2) 126 and 128 in FIG. 1.

An optical coupler (OPT1) 214 and a set of connectors (CON1, CON2, CON3) 216, 218, and 220 provide a "remote enable" function. In some user applications, the light source must be left powered-on in a standby mode. If the two pins of connector 220 are shorted and all the pins of connector 218 are left open, a diode (D2) 222 will become forward-biased by a current that flows through a resistor (R17) 224 from an external +5 V supply. A current will then bias the current sense input of IC 202, thus inhibiting any gate drive at outputs 210 and 212. In effect, the lamp is turned off even though the power supply 100 is still on.

The power supply 100 will stay in the standby condition until +5 V power is connected across the pins of connector 216. When a current greater than five milliamps flows through OPT1 214, its output transistor will switch on and clamp the junction of diode 222 and resistor 224 to ground. This allows the internal current sense amplifier in IC 202 to enable the gate drive at outputs 210 and 212. Other additional interlocks can be wired to connector 220.

A +5 V signal is provided by the user from a remote location to connector 216 when and as long as lamp output is required. An accidental disconnection will cause the lamp to go off when the power supply 100 reverts to its standby mode.

Figure 3:
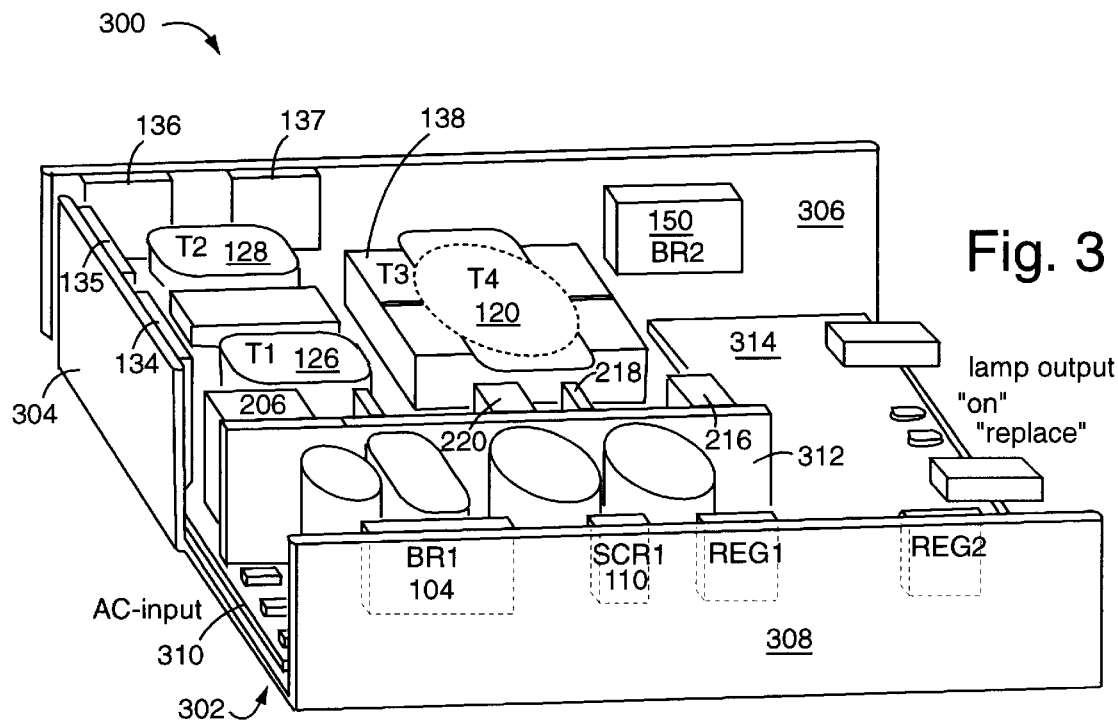
FIG. 3 is a top view of a typical way to physically construct an arc lamp power supply embodiment of the present invention, it includes an open-frame chassis and three printed circuit boards.

FIG. 3 represent an open-frame power supply 300. Power supply 100 (FIG. 1) and the switch mode controller 200 (FIG. 2) are preferably constructed like power supply 300. To see how this is possible, those components that were illustrated in the schematics of FIGS. 1 and 2 will be referred to by their original reference numerals.

An aluminum chassis 302 is formed into a U-channel. A side channel leg 304 is bent up perpendicular on an end that receives the AC-input. A top channel leg 306 is turned up on one side. A bottom channel leg 308 is turned up on the opposite side. Such legs are used as heatsinks for various active components. A motherboard printed circuit board (PCB) 310 is mounted on standoffs inside the U-chassis 302. A daughterboard PCB 312 mounts on end to the motherboard PCB 310. Most of the circuitry illustrated in FIG. 2 is carried on the daughterboard PCB 312. A trigger PCB 314 mounts on three studs on the motherboard PCB 310 that also make the necessary electrical connections. The components of the trigger circuit 162 are mounted to the trigger PCB 314.

The four MOSFET transistors 134–137 mount in the corner area of legs 304 and 306. Transformers (T1, T2) 126 and 128 are mounted to the motherboard PCB 310, preferably very close to the MOSFET transistors 134–137 so the wire leads can be kept short to reduce any stray pickup from T3. The BR2 output diode 150 and each MOSFET is electrically insulated from and thermally heatsinked by the U-chassis 302, e.g., using mica insulators. BR2 will dissipate about thirty watts when operating a 300 W arc lamp, therefore an adequate insulator and mounting solution are critical. Outputs for the lamp "ON" and lamp "REPLACE" indications and the fan power output are to the right on the trigger PCB 314.

Figure 4:
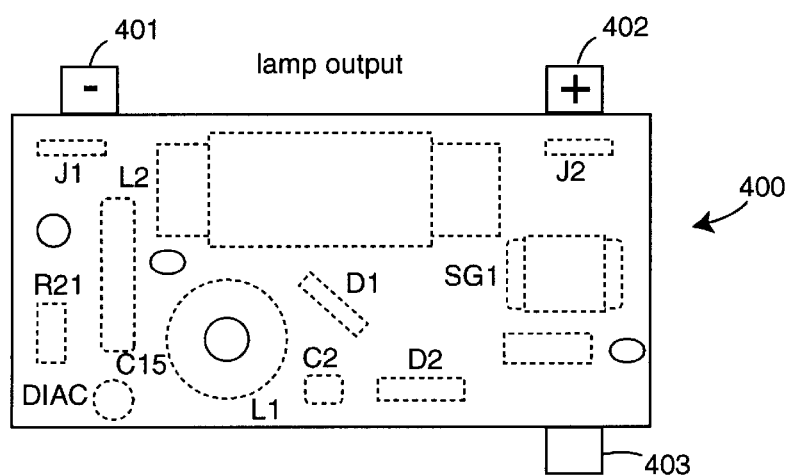
FIG. 4 is a top view of a trigger or lamp igniter printed circuit board for the arc lamp power supply embodiments of the present invention shown in FIGS. 1–3.

FIG. 4 illustrates a trigger PCB 400 that is similar to trigger circuit 162 and PCB 314. The trigger PCB 400 mounts to the motherboard on a set of three pillars 401–403, one for ground, one for the 200 VDC boost, the third being an insulating pillar that helps stabilize the PCB. The output connection to the CERMAX lamp uses 2×0.25 spade connectors.

Figure 5:
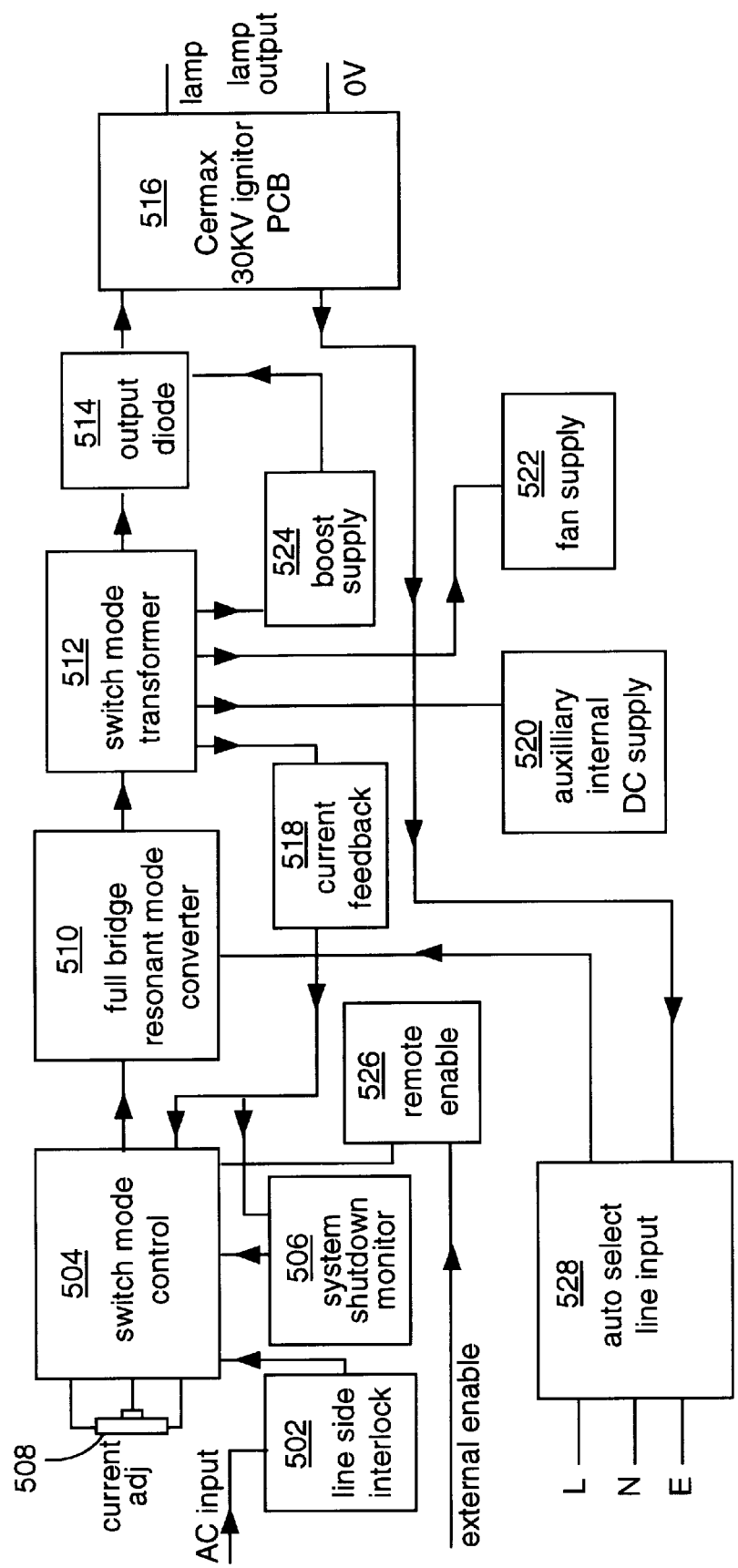
FIG. 5 is a functional block diagram of a general high-intensity short arc lamp power supply embodiment of the present invention.

FIG. 5 represents a power supply embodiment of the present invention for a high-intensity short arc lamp, referred to herein by the general reference numeral 500. Utility power is input (AC-in) through a line-side safety interlock 502. A switch mode controller 504 like that illustrated in FIG. 1 receives the AC-input and control signals from a system shut-down monitor 506. A lamp-current adjustment 508 is the equivalent of variable resistor 206 in FIG. 2. A full-bridge resonant mode converter 510 is similar to the combination of T1 126 and T2 128, and the four MOSFET transistors 134–137 in FIG. 1. This drives a switch-mode transformer 512, such as T3 138 in FIG. 1. An output diode 514 converts the AC power from the switch-mode transformer 512 into direct current, and is similar to BR2 150 (FIG. 1). A CERMAX 30 KV ignitor 516 provides the starting pulse needed by an arc lamp, and is similar to trigger 162 in FIG. 1.

In embodiments of the present invention, the switch-mode transformer 512 is used to power a lamp-current feedback 518, an auxiliary power supply 520, a fan power supply 522, and a boost power supply 524. The function of the lamp-current feedback 518 is represented by current-sense transformer T4 120 (FIG. 1) and IC 202 (FIG. 2). A remote enable 526 is equivalent to the combination of OPT1 214, diode D2 222, and resistor R17 224 (FIG. 2). A line-input auto-selector 528 is represented in FIG. 1 by choke L1 102, bridge BR1 104, IC1 112, SC1 110, capacitors C6/C7 106/107, and their associated components. The line-input auto-selector 528 automatically maintains its DC rectified output at a near constant voltage despite being connected to a variety of mains-voltages by changing between half-wave and full-wave modes.

In alternative embodiments of the present invention, the power supply 100 automatically shuts down in a failsafe condition should the lamp fail to ignite after five seconds of turn on. In operation, the lamp is ignited by one trigger pulse. Too many trigger pulses being needed indicates a problem with the lamp. Once the lamp ignites, a heavy DC electrode current will flow. Too high a voltage across the lamp, or too high a current during operation can also signal trouble. The power supply 100 preferably shuts down automatically in a failsafe condition should the lamp develop a short circuit, or if the cooling fan loses its operating power. Alternatively, power supply embodiments of the present invention automatically shut down in a failsafe condition when the average lamp load current exceeds a safe level, e.g., 25.0 amps.

Figure 6:
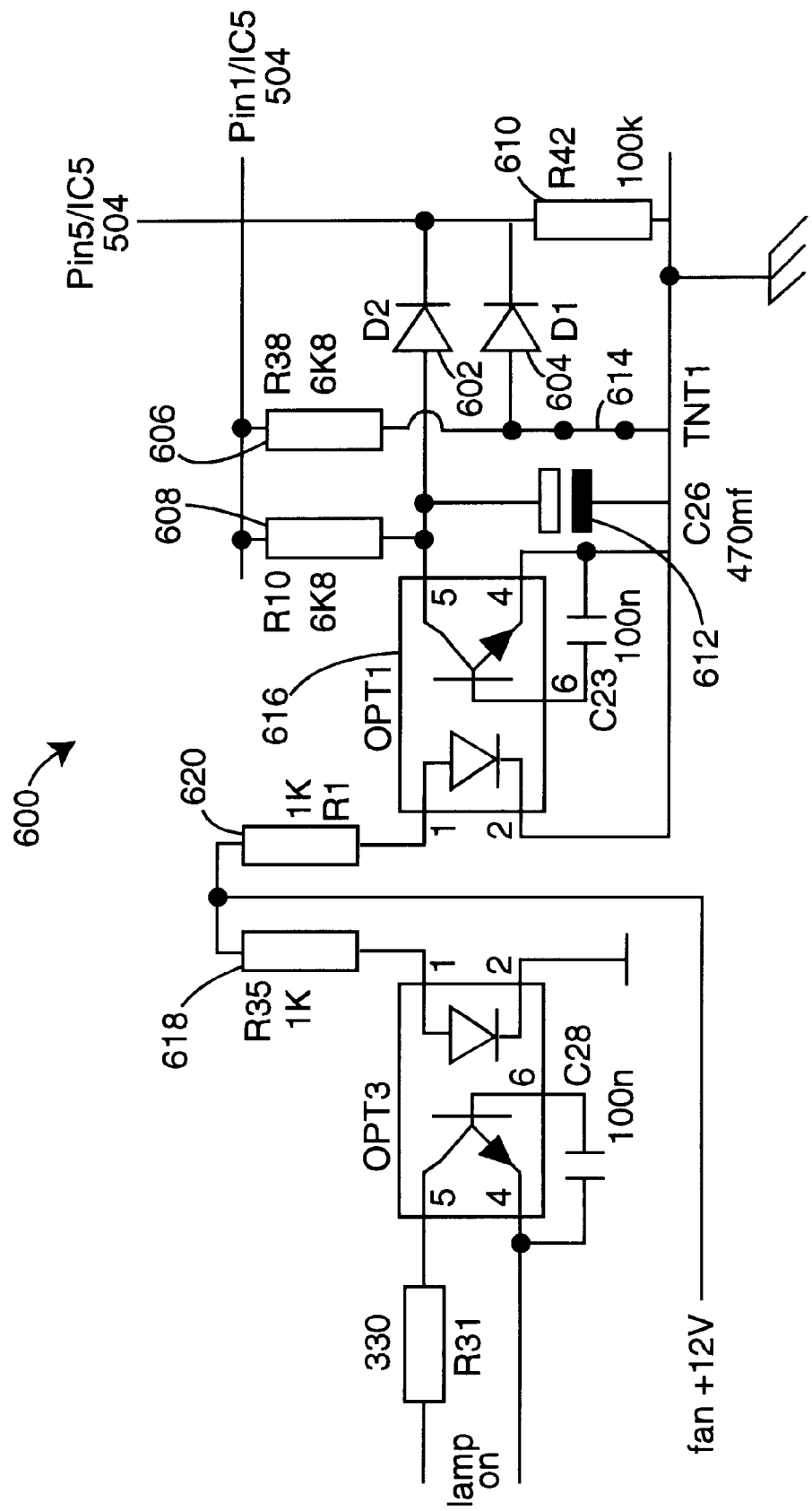
FIG. 6 is a schematic diagram of a circuit that can shut down the lamp power supply should the lamp fail to ignite after a limited number of trigger pulses.

Alternative embodiments of the present invention include a circuit 600 shown in FIG. 6 that can disable the lamp power supply if the lamp fails to ignite after ten trigger pulses have been applied. A pair of diodes 602 and 604, and a pair of resistors 606 and 608, form a logical OR-gate with an output at the top of a resistor 610 connected to an input of integrated circuit 504 (FIG. 5). A capacitor 612 combines with resistor 608 to form an R-C time constant equal to the usual delivery time of ten trigger pulses.

If a jumper-wire 614 is left open, diode 604 will be forward biased, pulling the top of resistor 610 high. But if the jumper-wire 614 is present, diode 604 will be reversed biased and such will allow the switch mode controller 504 to be controlled by the current feedback monitor 518 (FIG. 5). The jumper 614 allows the trigger-limit option to be disabled.

In operation, the open-collector output on an opto-isolator 616 must clamp the junction of resistor 608 and diode 602 low before the resistor 608 can charge capacitor 612 high enough to forward bias diode 602 and pull the top of resistor 610 high. When power is first applied at the tops of resistors 608 and 606, the igniter will start delivering trigger pulses to the lamp. If the lamp ignites, the fan's 12 VDC power supply will come up and be applied to the tops of a pair of resistors 618 and 620. This will, in turn, energize the input of opto-isolator 616. But if the lamp does not ignite, the fan's 12 VDC power supply will not come up and be present at the tops of resistors 618 and 620. Capacitor 612 will be free to charge up through resistor 608 according to their combined R-C time constant. The top of resistor 610 will go high and integrated circuit 504 (FIG. 5) will be shut down.

Embodiments of the present invention provide a visual indication of lamp-on so that the lamp itself can be operated out of sight of the power supply. They also include a visual indication of end-of-lamp-life so that the lamp itself can be operated out of sight of the power supply and the operator need not try to guess when lamp output luminance is too low.

Although the present invention has been described in terms of the presently preferred embodiments, it is to be understood that the disclosure is not to be interpreted as limiting. Various alterations and modifications will no doubt become apparent to those skilled in the art after having read the above disclosure. Accordingly, it is intended that the appended claims be interpreted as covering all alterations and modifications as fall within the true spirit and scope of the invention.

What is claimed is:

1. An arc lamp power supply, the improvements comprising:
   a rectifier for converting alternating current utility power into direct current;
   a switch-mode controller providing a pair of gate drive signals according to a lamp-power output feedback signal and a current-level adjustment, and operating at a resonant frequency;

a full-bridge resonant mode converter connected to receive said pair of gate drive signals and including four MOSFET power transistors in two parallel totem-pole circuits;

a switch-mode transformer connected to be driven by said four MOSFET power transistors and having a center-tapped secondary output winding;

a bridge rectifier connected to said secondary output winding of the switch-mode transformer and providing a direct current for an arc lamp to operate;

a boost power supply connected to temporarily increase said direct current for an arc lamp to operate;

an igniter connected to add high voltage initiation pulses to said direct current for an arc lamp to operate; and a safety interlock connected to bias said lamp-power output feedback signal such that the switch-mode controller can cancel said pair of gate drive signals, the safety interlock including an opto-isolator with an input that must receive a constant current for an output to release said bias and allow said lamp-power output feedback signal and the switch-mode controller to provide said pair of rate drive signals.

2. The arc lamp power supply of claim 1, wherein:

the safety interlock further includes a connector that must have some of its pins shorted together in order for said opto-isolator to allow said lamp-power output feedback signal and the switch-mode controller to provide said pair of gate drive signals.

3. An arc lamp power supply, the improvements comprising:

a rectifier for converting alternating current utility power into direct current;

a switch-mode controller providing a pair of gate drive signals according to a lamp-power output feedback signal and a current-level adjustment, and operating at a resonant frequency;

a full-bridge resonant mode converter connected to receive said pair of gate drive signals and including four MOSFET power transistors in two parallel totem-pole circuits;

a switch-mode transformer connected to be driven by said four MOSFET power transistors and having a center-tapped secondary output winding;

a bridge rectifier connected to said secondary output winding of the switch-mode transformer and providing a direct current for an arc lamp to operate;

a boost power supply connected to temporarily increase said direct current for an arc lamp to operate;

an igniter connected to add high voltage initiation pulses to said direct current for an arc lamp to operate;

a "lamp-on" indicator that monitors a voltage output by the bridge rectifier and that gives an "on" indication if such voltage does not exceed a first threshold voltage;

a "lamp-replace" indicator that monitors a voltage output by the bridge rectifier and that gives a "replace" indication if such voltage exceeds a second threshold voltage;

a safety interlock connected to bias said lamp-power output feedback signal such that the switch-mode controller can cancel said pair of gate drive signals;

an opto-isolator with an input that must receive a constant current for an output to release said bias and allow said lamp-power output feedback signal and the switch-mode controller to provide said pair of gate drive signals; and a connector that must have some of its pins shorted together in order for said opto-isolator to allow said lamp-power output feedback signal and the switch-mode controller to provide said pair of gate drive signals.

* * * * *